NORMAN B. MILLER
MILES T. PIGOTT
DAVID C. WHITMARSH
RICHARD O. ROWLANDS
INVENTORS

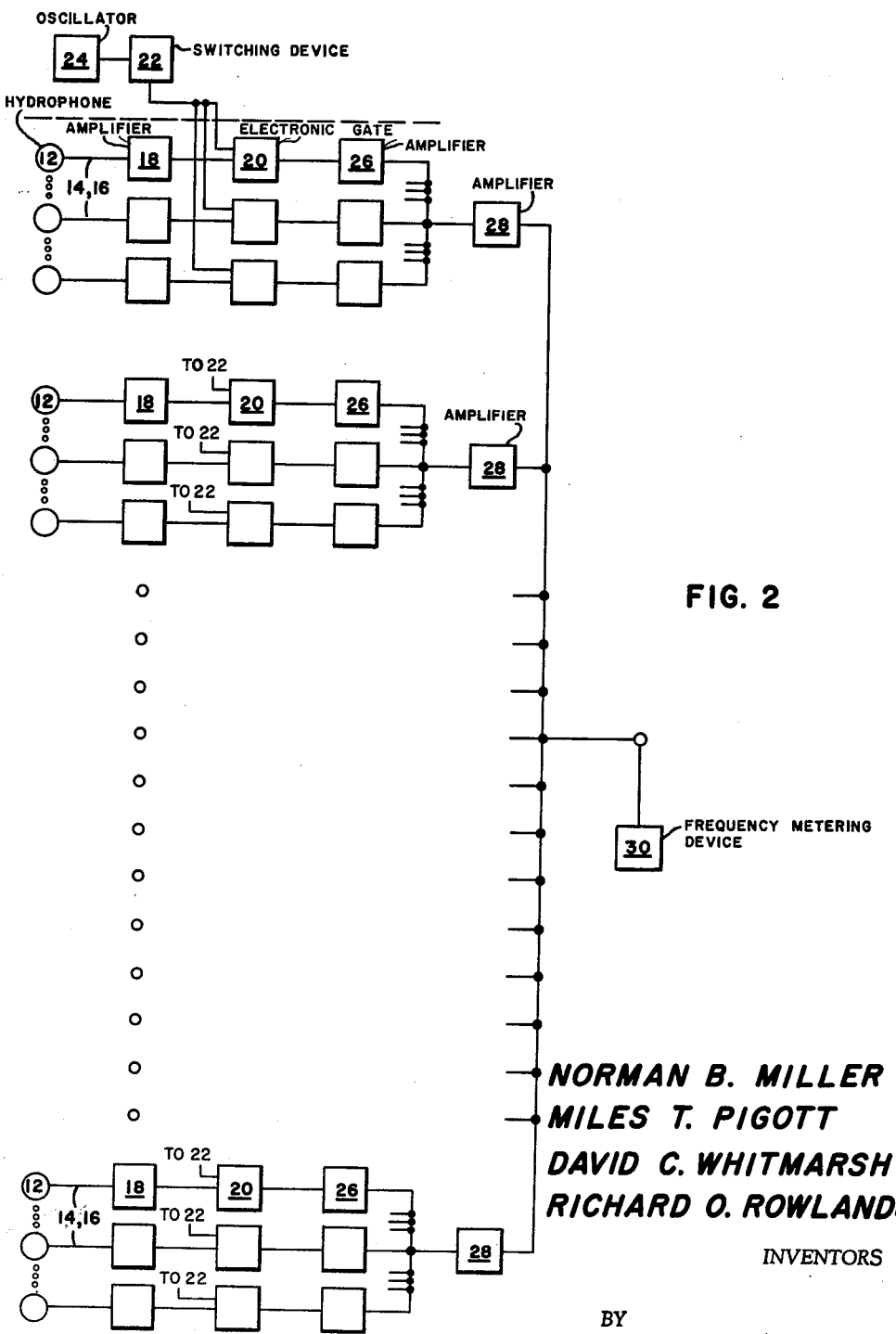

NORMAN B. MILLER
MILES T. PIGOTT
DAVID C. WHITMARSH
RICHARD O. ROWLANDS
INVENTORS

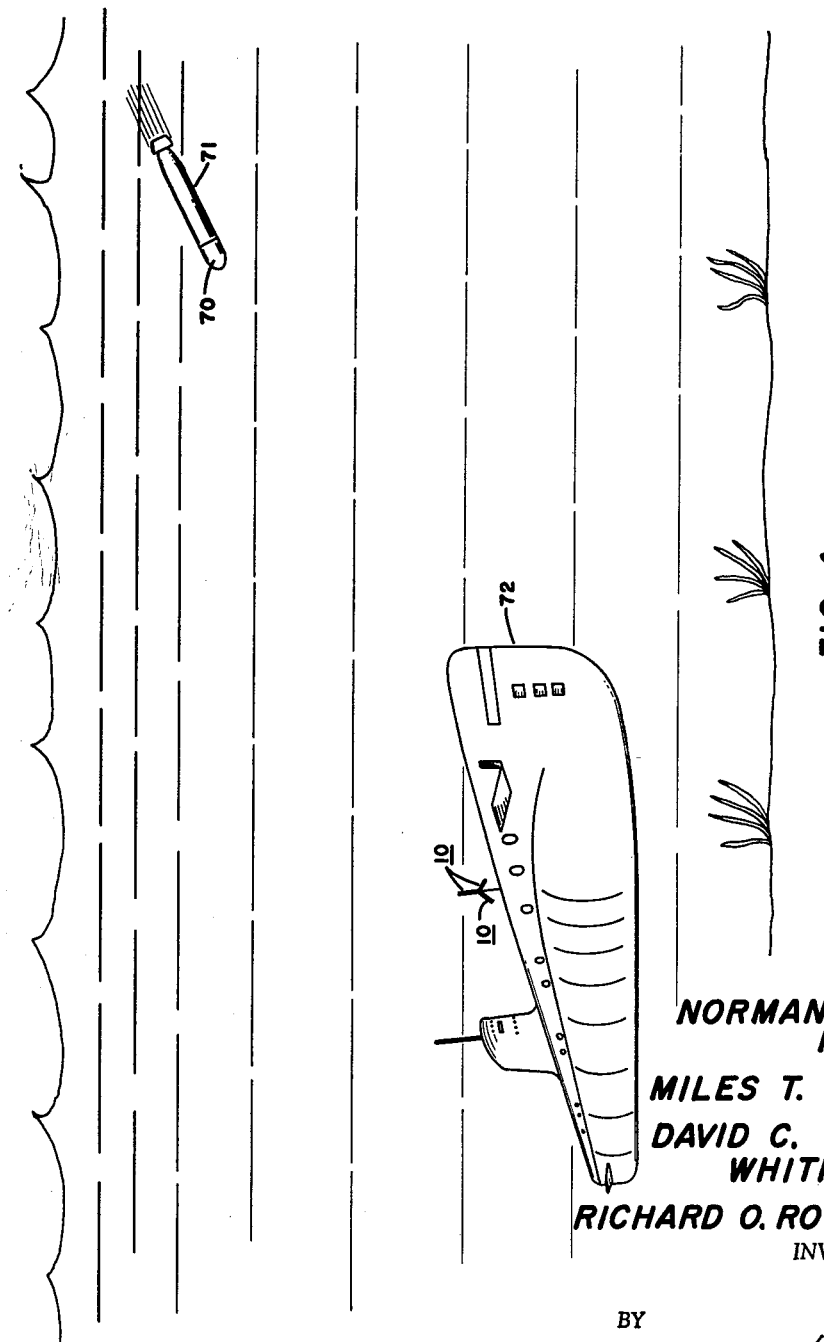

United States Patent Office 3,113,286
Patented Dec. 3, 1963

3,113,286
ACOUSTICAL WAVE DIRECTION
DETERMINING DEVICE
Norman B. Miller, Pine Grove Mills, and Miles T. Pigott, David C. Whitmarsh, and Richard O. Rowlands, State College, Pa., assignors, by mesne assignments, to the United States of America as represented by the Secretary of the Navy
Filed Mar. 6, 1961, Ser. No. 93,817
4 Claims. (Cl. 340—6)

This invention relates to an acoustical direction determining system and in particular, to an acoustical system capable of determining the angle of arrival of signals originating from an external acoustical source.

In naval fleet exercises, dummy or tame underwater ordnance, such as torpedoes, are frequently launched against surface vessels and submarines. To better evaluate the effectiveness of these exercises, it is desirable to be able to determine the position of such underwater ordnance relative to the target vessel or submarine.

This invention provides an omni-directional means of tracking or plotting the angular movement of underwater vehicles as they proceed through the water. The system described requires an acoustical transmitter or vibration producer to be located in the tracked vehicle. A receiving-hydrophone system positioned on the tracking vessel or anchored in a stationary location receives acoustical vibrations from the transmitter and processes them to determine the angle of arrival of the acoustical signal.

The present direction determining system, therefore, determines the bearing of the acoustical transmitter by means of an array of acoustical receivers, or hydrophones, arranged in a line and tuned to receive the frequency of the acoustical transmitter. A prime advantage of the invention is its ability to determine the angle of arrival of acoustical waves from any direction without changing its position. The system utilizes the well known "Doppler" effect which notes that the frequency of an observed sound differs from the frequency of the source whenever the source and the observation point are in motion relative to one another. The outputs of each individual hydrophone of the array are sampled sequentially along the array line at a known scan speed. This is done in such a manner that the output sample is a signal similar to that produced by a single hydrophone moving through the transmitter-produced wave front. The output frequency from the hydrophone may be analyzed in accordance with the readily derivable "Doppler" equation $f = f_0(1 \pm \alpha \cos \theta)$ in which $f_0$ is the frequency of the sound, $\alpha$ is the ratio of the scanning speed of the array to the sound speed in water, and $\theta$ is the bearing angle to be deduced. The angle $\theta$ may be determined by solving this equation.

In more detail, the invention is comprised of an electronic switching device capable of sampling the hydrophone array output, sequentially at a predetermined rate, and a network, designed to amplify and add incoming signals from the switching device without distortion. The output from the network is analyzed by a conventional frequency measuring device which determines the frequency of the output signal. By substituting this frequency into the above mentioned formula, the angle or bearing, at which the acoustical signal arrives may be readily determined.

The object of this invention, therefore, is to provide an acoustical omni-directional system capable of determining the angle of arrival of an incoming acoustical wave front.

Another object of this invention is to provide a means for tracking the angular position of underwater ordnance relative to a target.

Still another object of this invention is to provide a method of sequential sampling or scanning of the output signals of a line array of hydrophones so as to produce a resultant output signal equivalent to that produced by a single hydrophone being moved at a predetermined scan speed.

Other objects, and a fuller understanding of the invention, may be had by referring to the following description and claims, taken in conjunction with the accompanying drawings, in which:

FIGURE 2 is a block diagram of the system indicating the sequence of signal processing.

FIGURE 4 represents the line array portion of the device positioned on the deck of a submerged submarine.

Figure 1:
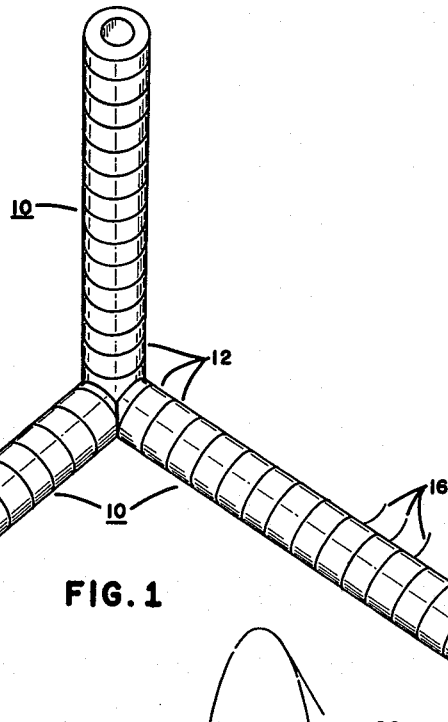
FIGURE 1 is a diagrammatic representation of the receiving line array of the invention.

Referring now to FIGURE 1, the signal receiving portion of the device is indicated as three line arrays 10. These line arrays are mutually perpendicular. Donut-shaped omni-directional hydrophone elements 12 usually of the piezoelectric type are positioned in a line, each adjacent to the other. Ground lead 14 is connected commonly to each hydrophone element 12, of the array 10, and signal leads 16 extends from each individual hydrophone element.

Referring now to FIGURE 2, leads 14 and 16 extend from hydrophone 12 to amplifier 18, which is of the conventional type having about four stages of amplification. The response from amplifier 18 is connected to electronic gate 20, which in turn is associated and controlled by an electronic switching device 22. Switching device 22 is conventionally a beam switch tube distributor circuit having the same number of outputs as the number of hydrophones. Switching device 22, is, in turn, connected and driven by a conventional oscillator 24 in a manner well known in the art.

The output from gate 20 is connected to amplifier 26, generally of the one stage type providing some gain. Switching device 22 is adapted to sequentially connect the outputs of hydrophones 12 to amplifier 26 at a predetermined scan rate in such a manner that only a single hydrophone is connected at a time. The responses from output amplifier 26 and a first tier of eight similarly connected amplifiers are added and the resultant signal connected to amplifier 28, which is identical to amplifier 26. The outputs from amplifier 28 and a second tier of fourteen other amplifiers similarly connected, are added and supplied to a frequency metering device 30, capable of determining the frequency of input signals. It should be noted that the number of amplifiers in the first and second tier is given by way of example only and is not intended to limit the number which may be used in the operating device. Frequency meter 30 is of the conventional commercially available type, or one designed specifically for this purpose. The frequency meter 30 is calibrated to read in terms of angle in accordance with the previously mentioned equation. As may be seen, the resultant device connects sequentially the amplifier output originating from hydrophone 12 to the frequency meter 30. Since this connection is made at a rapid rate to hydrophones along the array 10, it appears to frequency meter 30 that a single hydrophone is being moved along the array line 10 at the scan rate.

Figure 3:
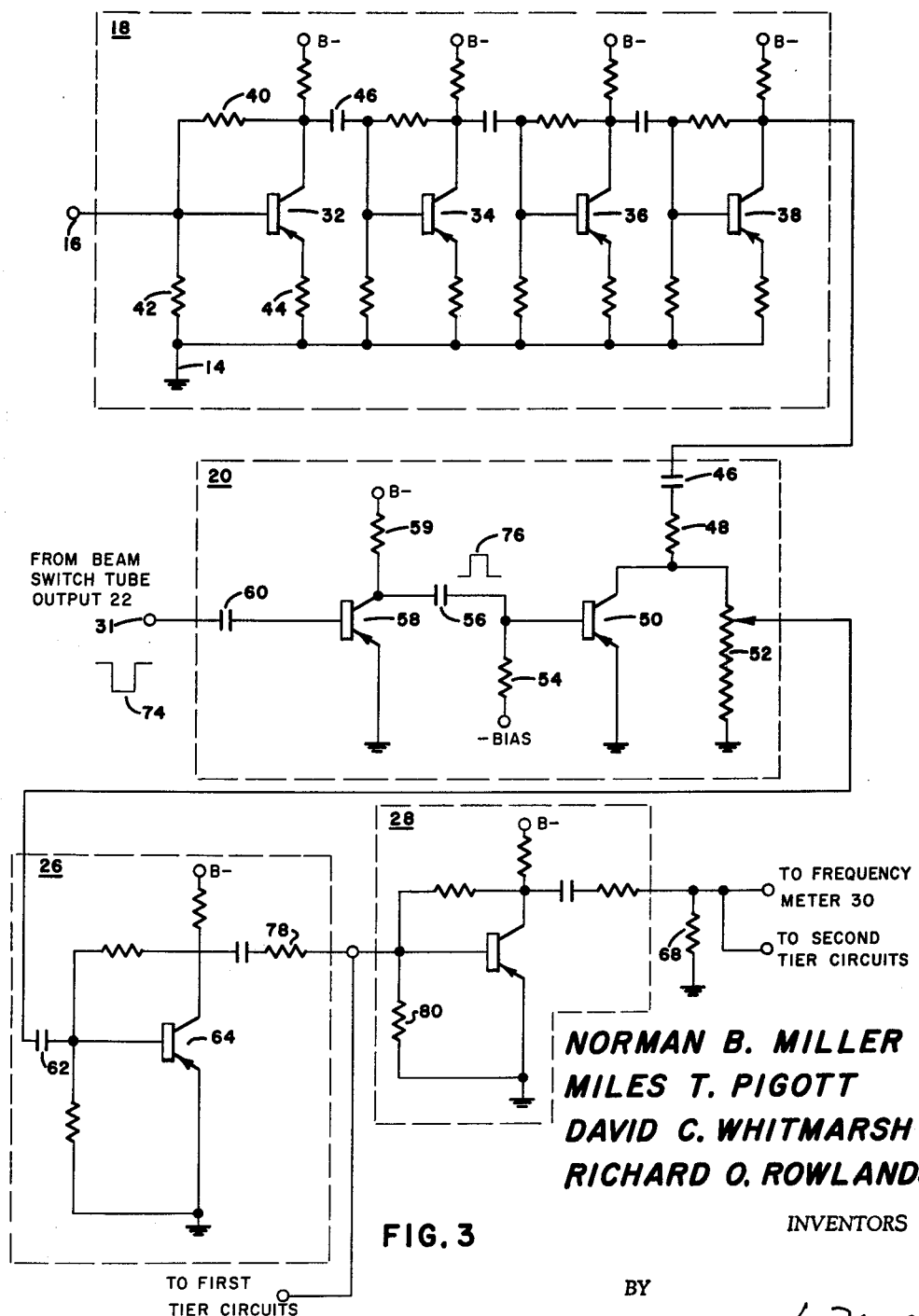
FIGURE 3 is a schematic diagram of the blocks of FIG. 3, shown in greater detail.

A more detailed illustration of the device may be seen with reference to FIGURE 3, in which a portion of the circuit connected to a single hydrophone, is shown. Circuits from all other hydrophone elements are of course identical. The signal from a single hydrophone 12 is connected by signal lead 16 to amplifier 18, which here is indicated as a four stage transistorized unit having transistors 32, 34, 36 and 38. Signal lead 16 is connected to the base of transistor 32, and also through bias resistor 40 to the collector terminal. Stabilizing resistor 42 is connected between signal lead 16 and ground lead 14, and feedback resistor 44 between the emitter terminal and ground lead 14. Coupling condenser 46 is positioned between the collector terminal and the succeeding stages of the amplifier 18 which are effectively the same as the one just described. The output of amplifier 18 is then supplied to gate 20.

Gate 20 serves as a mechanism for connecting the output from a single hydrophone 12 of the array 10, to amplifier 26 and ultimately to frequency meter 30. Gate 20 is activated by conventional beam switch tube 31, which is a mechanism adapted to rapidly and sequentially switch the outputs from each hydrophone 12 to amplifier 26. Switch tube 31, in turn, is driven by conventional oscillator 24 tuned to a frequency that will produce the desired rate of switching by switch tube 31. The sequential connection or sampling of the output of each hydrophone 12 of the array 10 is done so as to produce a known scanning speed along the array which is about one half of the speed of sound.

The output from amplifier 18 is fed to gate 20 through coupling capacitor 46 and resistor 48 to the collector terminal of transistor 50. Voltage dividing resistor 52 is connected between the collector terminal and ground. Emitter terminal of transistor 50 is grounded and the base terminal connected through bias resistor 54 to a source of negative bias. The base terminal of transistor 50 is also connected through isolating condenser 56 to the collector terminal of transistor 58. This collector terminal is also connected to a source of B-minus voltage through resistor 59. The emitter terminal is grounded. Base terminal of transistor 58 is connected through isolated capacitor 60 to the output of the beam switch tube 22 previously described.

A tap from voltage divider 52 is connected to amplifier 26 through blocking capacitor 62, and to the base terminal of transistor 64. Amplifier 26 operates as a conventional transistorized amplifier, and is similar in circuit to the first stage of amplifier 18 previously described. Amplifier 28, identical to amplifier 26, is connected to the output of amplifier 26. As previously described, the output of amplifier 26 is also connected to a first tier of eight other similar hydrophone circuits through adding resistor 78. Amplifier 28's input is grounded through adding resistor 80. Its output is connected to fourteen similar second tier circuits, and to frequency meter 30, as is indicated in FIGURE 2. Adding resistor 68 is positioned between ground and the input of frequency meter 30. It is now apparent that a signal originating at a single hydrophone, after amplification and switching, will reach frequency meter 30.

It may be readily seen by the here-in-above tiering arrangement of amplifiers 26 and 28, that the output signal from amplifier 26 is subject only to the distortion produced by only the parallel impedances of the other eight first tier hydrophone circuits. Likewise, the output signal from amplifier 28 is subject to the distortion produced by the parallel impedances of the other fourteen second tier circuits. By this tiering means, therefore, the signal passing through the system is subject to minimum distortion.

In operation, a pure acoustic tone of about 20 kc. is produced by acoustic transmitter 70, illustrated here in FIGURE 4 as housed in a naval torpedo 71. The tone is transmitted through the water and received by line array 10, here positioned on the deck of submarine 72. The acoustical waves are detected by each of the hydrophone elements 12 (FIG. 1) and fed into amplifier 18, where the signal is amplified. Oscillator 24, driving beam switch tube 22 at a predetermined scanning speed, produces a series of negative rectangular pulses 74 (FIG. 3), which pass through capacitor 60 into transistor 58, where they are inverted and clipped to appear as positive pulses 76. These positive pulses reach the base of transistor 50. Transistor 50 has been so biased through resistor 54 so that without the positive pulse 76, it will conduct from collector-to-base and to ground. Hence, any signals originating at amplifier 18 pass through capacitor 46 and resistor 48 and are grounded until a positive pulse 76 reaches the base terminal of transistor 50. When this happens, the negative bias on the base terminal is lessened and transistor 50 no longer conducts. The signal from amplifier 18, deprived of its path to ground, flows through voltage divider 52, amplifier 26, amplifier 28 and arrives at frequency meter 30.

As may be seen, the output from a single hydrophone element 12 of line array 10 is sampled or effectively connected to frequency meter 30 for only the duration of the pulse 76. The output from the next adjacent hydrophone element is then connected for the pulse duration and so on along the line. The speed at which the sampling process proceeds along the array 10 represents the previously mentioned scanning speed.

Beam switch tube 22 is adapted so that it will allow the signal from each hydrophone to sequentially reach frequency meter 30 at a predetermined scan rate. Thus the effective signal reaching frequency meter 30 is similar to one that would be produced if a single hydrophone were moved along the array line 10 at this predetermined scan rate. Frequency meter 30 indicates the apparent or "Doppler" frequency which, as previously stated, may be transposed, according to formula, into the angle of arrival of the acoustic wave front.

By way of example, a line array is eight feet long and is scanned at 0.6 the velocity of sound ($\alpha = 0.6$). Hence, the length of the array will be scanned once every 2.7 microseconds. The acoustical transmitter 70 operates at 20 kc. Two hundred and fifty-six hydrophone elements are used, spaced ⅜ of an inch apart along the line, thus allowing three samples per cycle. The maximum and minimum output "Doppler" frequencies of 32 kc. and 8 kc. correspond to directions of 0° with the simulated hydrophone moving directly towards the acoustic transmitter, and 180° with the hydrophone moving directly away from the transmitter. Other frequencies between will correspond to the angles between 0° and 180°. If the array 10 was positioned on an operating submarine, it is desirable to exclude all unwanted acoustical vibration from the system. This is effectively done by inserting between each hydrophone 12 and amplifier 26 a filter (not shown) designed to exclude all frequencies except that emitted by the acoustical transmitter 70. In practice, it was found that a one kc. bandwidth was adequate when the transmitter projected a tone of 20 kc.

Figure 5:
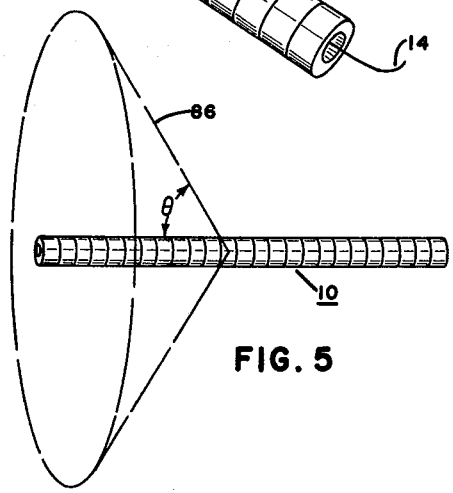
FIGURE 5 represents a single line array of FIG. 1 showing the detection cone.
Figure 6:
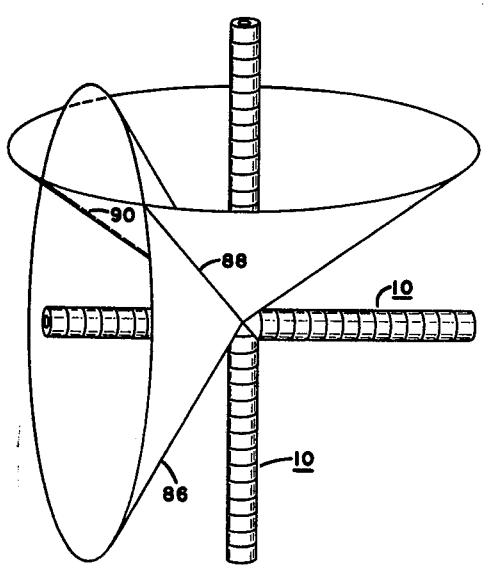
FIGURE 6 represents two mutually perpendicular single line arrays of FIG. 5, showing the intersecting detection cones of each.

The angle of arrival determined by one line array is the incident angle of the acoustic wave front with respect to the axis of the line. This is essentially the one direction cosine of a direction in space. As FIGURE 5 indicates, the acoustical wave may come in somewhere along a cone 86 of semivertex angle $\theta$. If two such line arrays are placed at right angles to each other and measure the same sound field, then, as shown in FIGURE 6, the acoustic source is then measured as positioned in the direction of the intersection of two cones, or by two straight lines 88 and 90. The ambiguity of two lines, of course, can be resolved completely by positioning a third array of right angles to the other two as shown in FIGURE 1. In such case the sound source angle is resolved completely and would be found along the intersection of three cones (not shown), or a straight line. The two line ambiguity could be ignored in applications where the signal could not possibly come from one of the two directions, as when the device is anchored on the ocean bottom. As may be seen, the system described is omni-directional in operation. It will determine the bearing of an acoustical wave front arriving from any angle or in any dimension, without pre-adjustment, focusing, or movement.

Although the foregoing description is relative to a single line array, and angle determined therefrom, it may be readily seen that a system comprising three line arrays of hydrophone in three dimensions, as FIGURE 1, may be readily constructed so that each array will measure the angle at which the sound source is positioned from the array. These three angles may be combined, to give a single definitive angle or bearing that the acoustical transmitter 70 in the torpedo is positioned from the line array 10. Likewise, although this description has emphasized a straight line array, it is within the contemplation of the invention that other geometrical array patterns in two or three dimensions may be used including a circle, ellipse, curved line or the like.

Although the description and application of this device has been herein described as applicable to acoustical waves traveling through water, it may be readily seen that its application may also be utilized in other media for other purposes. Hence, although we have described our invention with a certain degree of particularity, it is understood that the present disclosure has been made only by way of example, and that numerous changes in the details and construction of the combination and arrangement apart may be resorted to without departing from the spirit and scope of the invention as hereinafter claimed.

What is claimed is:

1. In a direction determining system, the combination comprising: transmitter means, capable of transmitting acoustical waves; a plurality of immovable acoustical receivers arranged in a predetermined pattern in space, capable of receiving signals emitted from said transmitter means; a plurality of first amplifier means each connected to a different one of said receivers and arranged to amplify the responses thereof; a plurality of switching means each contacting a different one of said first amplifier means arranged to sequentially contact each of said receivers through said first amplifier means at a predetermined scan rate; second amplifier means connected to said switching means for amplifying the responses thereof; and a frequency meter electrically contacting said second amplifier means whereby the frequency response thereof is measured; the entire system remaining stationary.

2. The combination as claimed in claim 1 in which the plurality of said acoustical receivers are arranged in three straight lines each mutually perpendicular to each other, whereby the entire system remains stationary.

3. The combination as claimed in claim 2 in which said switching means comprises a plurality of electronic gates driven by a beam-switching tube.

4. The combination as described in claim 3 in which said second amplifier means is comprised of a plurality of third amplifiers and a plurality of fourth amplifiers, said plurality of third amplifiers arranged inter-connected in a first tier, the output of which is connected to said plurality of fourth amplifiers arranged inter-connected in a second tier, said second amplifier means summing the responses from said switching means with little distortion.

References Cited in the file of this patent
UNITED STATES PATENTS

| | | |
|---|---|---|
| 2,405,281 | Bemis | Aug. 6, 1946 |
| 2,411,518 | Busignies | Nov. 26, 1946 |
| 3,015,800 | Jewett et al. | Jan. 2, 1962 |